May 28, 1968     F. J. P. J. BURGER ET AL     3,386,014
DECOUPLING AND LOCATING ANCHOR FOR ELECTROLYTIC CAPACITOR
Filed Oct. 22, 1965
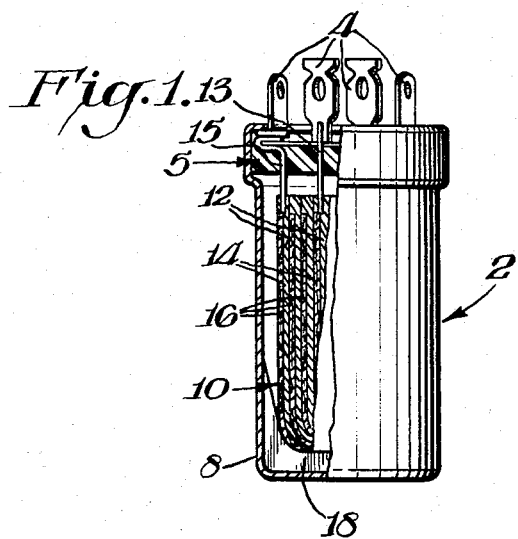
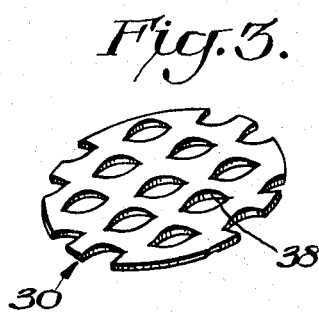
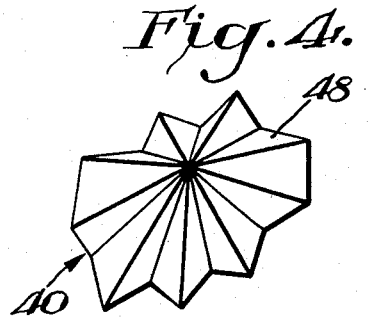
INVENTORS
*Francis J.P.J. Burger*
*Franz S. Dunkl*
BY *Connolly and Hutz*
ATTORNEYS United States Patent Office 3,386,014
Patented May 28, 1968

3,386,014
DECOUPLING AND LOCATING ANCHOR FOR ELECTROLYTIC CAPACITOR
Francis J. P. J. Burger, Toronto, Ontario, Canada, and Franz S. Dunkl, Williamstown, Mass., assignors to Sprague Electric Company, North Adams, Mass., a corporation of Massachusetts
Filed Oct. 22, 1965, Ser. No. 502,263
3 Claims. (Cl. 317—230)

ABSTRACT OF THE DISCLOSURE

Conductive anchoring means in the bottom of a conductive can serves the dual functions of centering a convolutely-wound multisection electrolytic capacitor element and also forcing the extended edges of the common cathode of the element into intimate electrical contact with themselves and the can.

---

This invention relates to electrolytic capacitors contained in a can, and more particularly to means for simultaneously anchoring the capacitor element in the can as well as improving its electrical performance.

The present invention is particularly relevant to a convolutely-wound multiple-section electrolytic capacitor wherein the capacitor winding is contained in a can closed by a cover which carries the terminals of the capacitor. The top end of the winding is secured to the cover by means of so-called "risers" or tabs whose function is to provide the electrical connection between the capacitor plates and the terminals. Separate means secure the bottom end of the capacitor assembly to the can bottom; the most common is the pouring of molten wax or pitch into the bottom of the can, so that, on cooling and hardening the pitch with the bottom end of the capacitor winding embedded therein, movement of the capacitor assembly is prevented.

Although various disadvantages of this prior art method have been recognized and pointed out and alternatives have been suggested (cf. U.S. 2,758,259 and 2,856,570) the practice of pouring pitch has persisted. Moreover, none of the various means that have been devised in the prior art for anchoring multisection capacitor elements within cans has in any way been effective in improving the electrical properties of the capacitor.

This invention is directed to improved mechanical and electrical mounting of multisection electrolytic capacitor elements within conductive cans. Moreover, this purpose is achieved in combination with fulfilling special performance requirements that are frequently encountered. In particular, one requirement in multisection electrolytic capacitors is that the coupling impedance between sections should be low, and this should be so over a wide frequency range, i.e. up to 100 kc. Hitherto, in order to lower the coupling impedance between sections it has been the practice to wind the capacitor elements with an "extended" cathode plate, i.e. the cathode of such capacitors projects and is exposed at the lower end of the capacitor winding. The projecting part of the cathode has then been crushed together and the resulting shorting-out of the individual turns of the cathode against each other reduced the coupling impedance.

It is an object of this invention to provide a more practical and advantageous alternative to the presently known methods of locating a multisection capacitor winding in a conductive can.

It is another object of this invention to provide means for anchoring a multisection capacitor element within a conductive can whereby the mechanical and electrical properties of the capacitor are improved.

Another object of this invention is to provide an improved means for reducing the coupling impedance between sections of a multisection electrolytic capacitor element and also anchoring the element within a conductive can.

The foregoing and other objects of this invention will become apparent upon consideration of the following description taken in conjunction with the accompanying drawing, in which:

FIGURE 1 is an elevational view partly in section of a capacitor constructed in accordance with this invention;
FIGURE 2 is a sectioned perspective view of an embodiment of a capacitor can for this invention;
FIGURES 3 and 4 are perspective views of embodiments of insert members for placement at the bottom of cans according to the teachings of this invention.

In accordance with this invention an electrolytic capacitor is provided with a multisection capacitor element having its cathode foil extending from the lower end and united by conductive anchoring means in the bottom of a conductive can. It has been found in the practice of our invention that a very considerable reduction in coupling impedance, especially at the higher end of the frequency range, can be achieved by ensuring good electrical contact between the exposed parts of the cathode and the can bottom.

The aforestated objects of the invention, namely of anchoring a multisection capacitor winding in a conductive can and of improving the coupling impedance between sections by providing low resistance connections between capacitor cathode and can bottom, are achieved by shaping the can bottom so as to provide locating and electrically connecting means that unite the cathode extensions.

Alternatively, instead of having the spacing-decoupling means incorporated in the capacitor can, a suitably shaped conductive insert is provided in the bottom of a conventional can. It is desirable to shape the insert in such a way that, on the exertion of downward pressure, as during the sealing operation of the capacitor, the insert is capable of expanding radially, thereby being locked against the side of the can as well as performing the aforementioned spacing and decoupling functions relative to the capacitor winding assembly. To prevent corrosion and other deleterious effects, it is important that the insert be constructed of a metal that is compatible with the electrolytic system, and preferably of the same metal and some degree of purity as the can.

It is a vivifying feature of this invention that the spacing-decoupling means, whether integral with the can or an insert, is shaped so as to force the extending edges of the cathode foil into intimate ohmic contact. In general, it is preferred that the spacing-decoupling means include a plurality of sloping arms of narrow cross-section that not only compress the foil ends, but also urge the capacitor element to a central location in the can.

The proposed modification of the can bottom and, alternatively, the proposed insert are described in detail with reference to the drawing. FIGURE 1 is a schematic of a capacitor 2 such as is the concern of the present invention showing i.e. the terminals 4, the cover assembly 5, the winding assembly 10 consisting of the anode and cathode risers 13 and 15, anodes 12 and cathode 14, the separator 16 (paper) separating anode 12 and cathode 14, and the conductive capacitor can 8. The drawing also indicates the presence and location of a conductive spacing and decoupling device 18, which according to the present invention can be either integral with or separate from the can 8.

According to one form the invention is to take, the capacitor container 8, as illustrated in FIGURE 2, is provided with a plurality of radiating ribs 28 which extend towards the center in the manner shown. Ribs 28 have the essential features of this invention of mashing the edges of the cathode foil while centering the capacitor element. These ribs 28, when the winding 10 is inserted and pressed home and after the capacitor 2 is sealed in the conventional manner, provide anchorage for the bottom end of the winding assembly 10 and, at this same time, electrical interconnections between the individual cathode turns 14 as well as a low resistance connection between cathode 14 and can 8.

Embodiments of inserts for performing the dual functions of spacing and decoupling are shown in FIGURES 3 and 4. Spacer-decoupler 30 provides a plurality of conductive criss-crossed arms 38 that present a large extent of edges to bite into the extending edges of cathode foil 14 and thereby effect ohmic contact between the cathode 14 and the bottom of can 8. In a like manner conductive spacer-decoupler 40 provides a plurality of outwardly sloping and radiating arms 48 that serve to unite the foil edges of cathode 14 and also to electrically join cathode 14 and can 8 in a low resistance contact.

Another variant of the invention is to use expanded-metal in making up the insert device which, by virtue of its having this particular construction feature, will possess improved locking and contact making capabilities.

In order to establish the advantages of this invention a series of experiments was run. Capacitor units were made in which circular pieces of expanded metal of the type shown in FIGURE 3 were inserted in a capacitor can. The inserts served as the spacing-decoupling device. Their effectiveness was tested by measuring the coupling impedance and comparing it with that of controls which differed only in the means for mounting the capacitor elements in their cans. Results of coupling impedance measurements are given in Table I. The capacitor units were 4-section aluminum electrolytics of the following rating:

850 _____ 16 v. DC.
400 _____ 16 v. DC.
100 _____ 4 v. DC.
15 _____ 11.5 v. RMS (audiofreq.).

Coupling impedance is defined as the ratio of induced voltage to input current, the latter to be applied to the larger of two sections involved, the smaller one being the one across which the induced voltage is measured. With a 4-section unit there exists a set of 6 such measurements. Instead of listing each individual measurement, the table presents the average of 6 measurements. Entries cover the frequency range from 120 c.p.s. to 40 kc.

TABLE I.—SUMMARY OF COUPLING IMPEDANCE MEASUREMENTS

| Item No. | Frequency (c./s.) | | | | | Construction Details | | |
|---|---|---|---|---|---|---|---|---|
| | 120 | 400 | 1K | 20K | 40K | Pitch | Swage | Insert |
| | Coupling Impedance (Milliohms) | | | | | | | |
| 1 | 3.0 | 3.0 | 3.5 | 4.7 | 12.0 | No | No | No |
| 2 | 2.8 | 2.4 | 2.6 | 3.6 | 5.5 | Yes | Yes | No |
| 3 | 1.2 | 0.9 | 1.1 | 1.1 | 3.2 | No | No | Yes |
| 4 | 2.4 | 1.6 | 1.9 | 2.0 | 3.8 | No | No | Yes |

A comparison of the values listed as items 3 and 4 in Table I on one hand with those of items 1 and 2, on the other hand, shows the effectiveness of the decoupling device in reducing coupling impedance to a substantial degree.

Other alternatives to those described for both the forms of the invention namely, one, in which the device is integral with the can and, two, in which the device is a separate entity to be inserted in the can, will readily come to those skilled in the art upon reflection on this invention. While the number of examples shown in the illustrations is limited, no such limitation is intended within the scope of the appended claims.

What is claimed is:
1. A capacitor comprising a conductive can, a convolutely wound multisection electrolytic capacitor element having a common cathode foil extending from an end thereof, the extending edges of said cathode foil being forced into intimate contact with one another, conductive means located at the bottom of said can with edges of said cathode foil in intimate contact therewith, said conductive means including a plurality of conductive arms forcing together a substantial portion of said edges and centering said element in said can.
2. The capacitor of claim 1 wherein said conductive means is integral with said can.
3. The capacitor of claim 1 wherein said conductive means is an insert positioned in said can.

References Cited
UNITED STATES PATENTS

| | | | |
|---|---|---|---|
| 2,856,570 | 10/1958 | Peck | 317—230 |
| 3,174,085 | 3/1965 | Schroeder et al. | 317—230 |
| 3,346,781 | 10/1967 | Moresi et al. | 317—230 |

JAMES D. KALLAM, *Primary Examiner.*

UNITED STATES PATENT OFFICE
CERTIFICATE OF CORRECTION

Patent No. 3,386,014                          May 28, 1968

Francis J. P. J. Burger et al.

It is certified that error appears in the above identified patent and that said Letters Patent are hereby corrected as shown below:

Column 1, line 37, before "the", first occurrence, insert -- of --. Column 2, line 47, "some" should read -- same --. Column 4, TABLE I, second column, line 4 thereof, "2.4" should read -- 1.4 --.

Signed and sealed this 2nd day of December 1969.

(SEAL)
Attest:

Edward M. Fletcher, Jr.                      WILLIAM E. SCHUYLER, JR.

Attesting Officer                              Commissioner of Patents